United States Patent [19]
Kraft et al.

[11] 4,397,096
[45] Aug. 9, 1983

[54] METHOD OF AND APPARATUS FOR POSITIONING THE DRIVE UNITS OF A PLURAL DRIVE ESCALATOR

[75] Inventors: Joseph K. Kraft, Parsippany, N.J.; George A. Kappenhagen, Stroud Township, Monroe County, Pa.

[73] Assignee: Westinghouse Electric Corp., Pittsburgh, Pa.

[21] Appl. No.: 292,974

[22] Filed: Aug. 14, 1981

[51] Int. Cl.[3] .......... G01B 7/00
[52] U.S. Cl. .......... 33/181 R; 73/9; 198/502; 198/856
[58] Field of Search .......... 33/181 R, 180 R; 198/502, 856; 73/9

[56] References Cited

U.S. PATENT DOCUMENTS

| | | | |
|---|---|---|---|
| 3,149,715 | 9/1964 | Massimiani | 198/856 |
| 3,688,557 | 9/1972 | Marinus | 73/9 |
| 3,972,221 | 8/1976 | Natens et al. | 73/9 |

*Primary Examiner*—William D. Martin, Jr.
*Attorney, Agent, or Firm*—D. R. Lackey

[57] ABSTRACT

A method of, and apparatus, for determining the direction of force in a moving escalator having a plurality of drive units coupled to an endless, articulated belt. The direction of force, and the duration of such force in a direction which indicates compression of the belt at each drive unit, is used to align and properly space the drive units for optimal load sharing.

14 Claims, 10 Drawing Figures

METHOD OF AND APPARATUS FOR POSITIONING THE DRIVE UNITS OF A PLURAL DRIVE ESCALATOR

BACKGROUND OF THE INVENTION

1. Field of the Invention

The invention relates in general to escalators, and more specifically to escalators which have two or more drive units coupled to drive the endless belt to which the escalator steps are attached.

2. Description of the Prior Art

U.S. Pat. Nos. 3,677,388 and 3,707,220, which are assigned to the same assignee as the present application, disclose a modular drive unit, and modular passenger conveyor construction, respectively. The modular drive units are inserted into selected modules of the passenger conveyor, on the inclined portion thereof, according to vertical rise. For example, for a 48 inch wide escalator, a single drive unit is used up to 20 feet of rise, with an additional drive unit being added for each multiple of 20 feet of rise thereafter.

When more than one drive unit is used, the drive units must be precisely spaced from one another such that each supports the load of the running gear, i.e., steps, step axles and step links, between itself and the next lower drive unit on the incline. To illustrate the criticality of drive unit spacing, assume a three drive unit escalator. If the drive units are initially spaced such that each supports all of the load between it and the next lower drive unit, i.e., all step links are in tension, and then the middle drive unit is moved down the incline by only 0.125 inch, then all of the load between the two lower drive units will be imposed on the uppermost drive unit, and the middle drive unit would support no mechanical load.

In order to assure that such a condition does not exist, the recommended adjustment of the drive units is to move each of the drive units which are located below the uppermost drive unit slightly up the incline from the location which tensions every step link between the drives, so that one to two step links are in compression as they leave each of the lower drive units.

This recommended adjustment, however, is difficult and time consuming to achieve. Calculation methods all relate to a static system, and are inaccurate due to variations due to the escalator brake, the hand rail drives, and the system friction. Further, once satisfactory drive spacing is initially achieved, the procedure must be repeated periodically in order to accommodate wear of the step link bushings, step links, and step axles.

SUMMARY OF THE INVENTION

Briefly, the present invention relates to a new and improved method of and apparatus for indicating the direction of force in a dynamic escalator system. In other words, the new method and apparatus are effective while the escalator is operating in its normal operational mode, eliminating the inaccuracies of measurements and calculations performed relative to a stationary escalator.

The invention includes a new apparatus or tool for indicating the direction of force applied to a predetermined step link, i.e., whether a step link is in tension or in compression, with this new tool providing this indication while the escalator is in operation. The new tool is quickly attached to a step link and adjusted while the step link is in tension, which is conveniently performed at the lower turn-around. The tool performs the force direction indication by detecting a change in the dimension between the adjacent step axles which pivotally interconnect adjacent step links on each side of the endless, articulated belt. When the link changes from being in tension to compression, which will normally occur as the step link leaves a drive unit, the dimension between the step axles is reduced slightly. The tool multiplies this slight dimensional change into a larger contact actuating movement, with suitable indicating means being connected to the contacts to provide an audible and/or visual signal while the step link is in compression.

The new and improved method utilizes this new tool to quickly determine proper drive spacing, both initially when the escalator is installed, and periodically thereafter, to determine if a drive unit, or units, should be repositioned, and if so, by how much. The method includes the steps of attaching the indicating tool to a step link on one side of the endless belt for providing an indication of when the step link is in compression, operating the escalator in the up travel direction, riding the escalator adjacent to the step link to which the indicating tool is attached, placing a first mark on a stationary portion of the escalator, such as the escalator skirt, when the indicating tool provides the indication that the step link has been placed in compression, and placing a second mark on the escalator when the tool ceases to provide the compression indication.

The step link will be placed in compression at the drive sprocket of each drive unit, and the escalator is marked for all drive units, except the uppermost drive unit. The tool is then attached to a step link on the other side of the endless belt, and the hereinbefore steps are repeated. The dimension between the first and second marks is then measured, and the measurement is used to determine if the drive spacing is correct. If it is not correct, the measurement is also used to determine the amount, and direction, each drive unit should be moved in order to provide the proper spacing. If the dimension is different on the two sides of a drive unit, the drive unit is misaligned, and the measurements of the two sides will automatically provide the dimensions which each side should be moved, to bring the drive unit into proper alignment, as well as to properly space the drive units.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
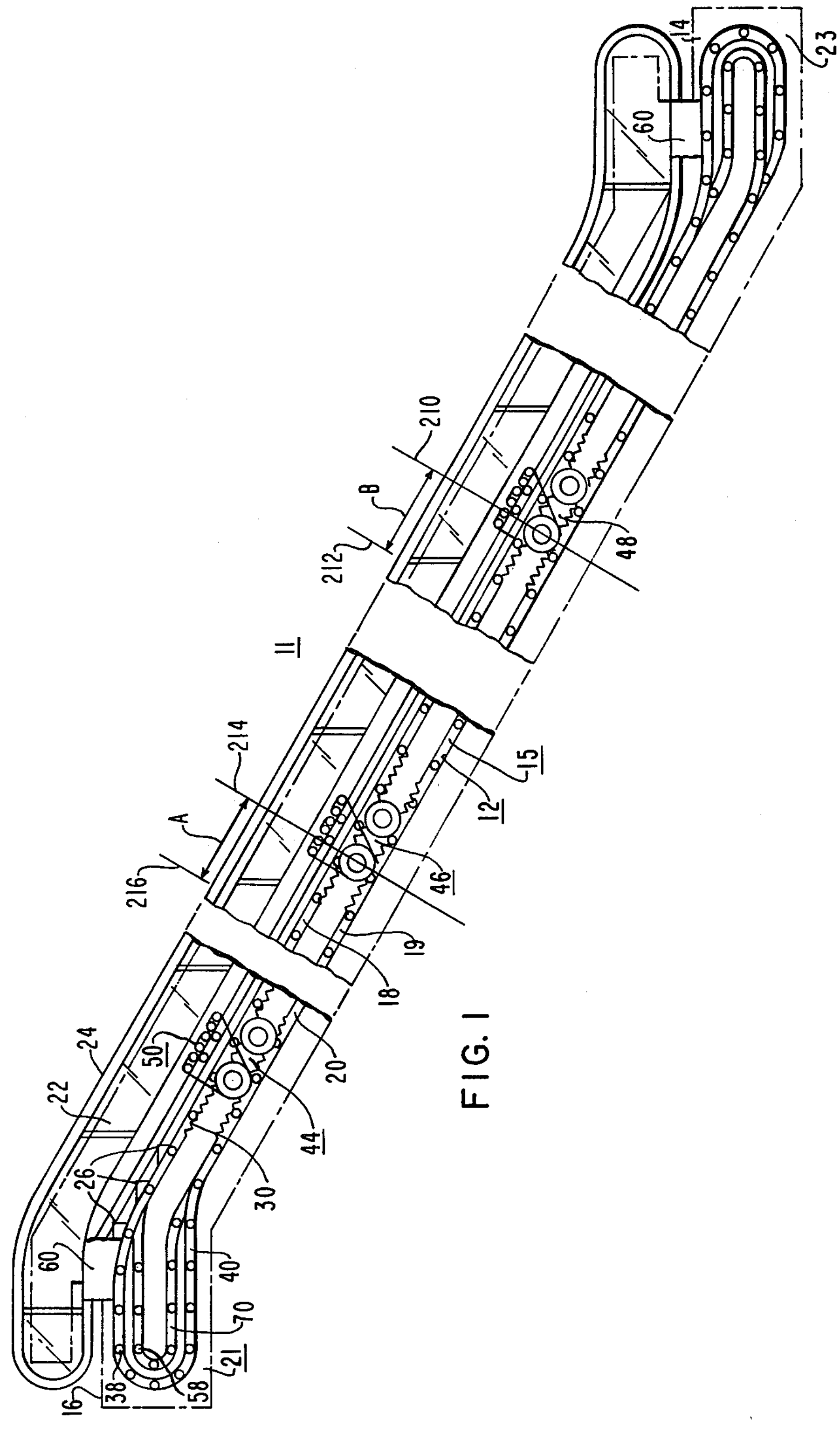
FIG. 1 is a elevational view of a plural drive escalator which may utilize the teachings of the invention.

Referring now to the drawings, and to FIG. 1 in particular, there is shown a plural drive escalator 11 of the type which may utilize the teachings of the invention. Suitable modular drive units, and the modules for accepting the drive units, are fully disclosed in the hereinbefore mentioned U.S. Pat. Nos. 3,677,388 and 3,707,220. Accordingly, these patents are hereby incorporated into the present application by reference, and the description of escalator 11 will be directed to the elements which are important to the present invention.

More specifically, escalator 11 includes a conveyor portion 12 for transporting passengers between a first landing 14 and a second landing 16. Conveyor 12 is of the endless type, having an articulated belt 15 which is driven about a closed path or loop. Conveyor 12 includes an upper load bearing run 18 upon which the passengers stand while being transported between the landings 14 and 16, a lower return run 19, and upper and lower turn-arounds 21 and 23, respectively, which interconnect the load bearing and return runs.

Conveyor 12 includes a plurality of steps 26, only a few of which are shown in FIG. 1. Steps 26 move in a closed path, with the rise of escalator 11 being such that the conveyor 12 is driven by at least two modular drive units, with first, second and third modular drive units 44, 46 and 48, respectively, being shown in FIG. 1 for purposes of example. The drive units are mounted on the incline, with the uppermost drive unit 44 being mounted just below the transition from the horizontal landing portion to the inclined portion. The endless flexible belt 15 has first and second sides, each of which are formed or rigid, pivotally interconnected toothed step links 30. The two sides of the belt 15 are interconnected by step axles 36, best shown in FIG. 2, to which the steps 26 are connected. The step axles 36 pivotally interconnect the adjacent ends of the step links 30. The belt 15 is supported by guide and support rollers or wheels 38 which coorperate with guide tracks 40. The steps 26, in addition to being supported by belt 15, are also supported and guided by trailer wheels or rollers 58 which cooperate with trailer guide tracks 70 to guide and support the steps 26 in the endless loop.

Each of the modular drive units 44, 46 and 48 includes a drive motor and gear reducer operably linked to sprocket wheels and chains which engage the toothed step links 30 of the conveyor 12, to propel the endless belt 15 about its guided path.

Figure 2:
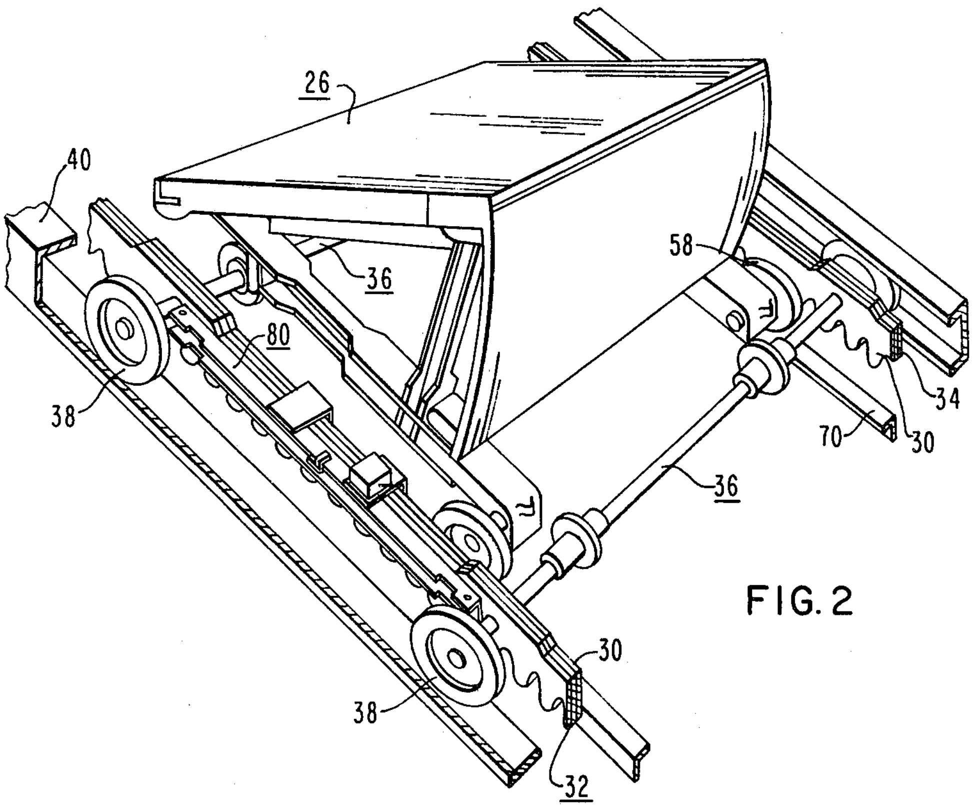
FIG. 2 is a fragmentary, perspective view of the escalator shown in FIG. 1.

FIG. 2 is a fragmentary, perspective view of a step 26 disposed in the load bearing run 18 of the conveyor 12, with parts removed and/or broken away in order to more clearly illustrate the toothed step link type of construction, as well as the position of a new and improved tool 80 which will be hereinafter described. First and second sides of the endless belt 15 form first and second closed loops 32 and 34, respectively, which are formed of the pivotally interconnected toothed step links 30. The two loops 32 and 34 are disposed in spaced, side-by-side relation, with the planes of the loops being vertically oriented. The spaced step axles 36 extend between the loops 32 and 34, transverse to the vertical planes thereof, with the ends of the step axles 30 extending through aligned openings of the adjacent step links 30 of the loops 32 and 34. The step links 30 may be formed of stacked, metallic laminations, riveted together, such that their ends dovetail, enabling openings in their ends to be aligned while also aligning the step links 30 of each loop. The step links may also be formed as disclosed in U.S. Pat. No. 4,232,783, which is assigned to the same assignee as the present application. The step axles 36 have shoulders disposed thereon which axially locate the steps 26 on the step axle. The steps may be clamped to the step axles 36 as disclosed in U.S. Pat. No. 3,798,972, which is assigned to the same assignee as the present application.

Figure 4:
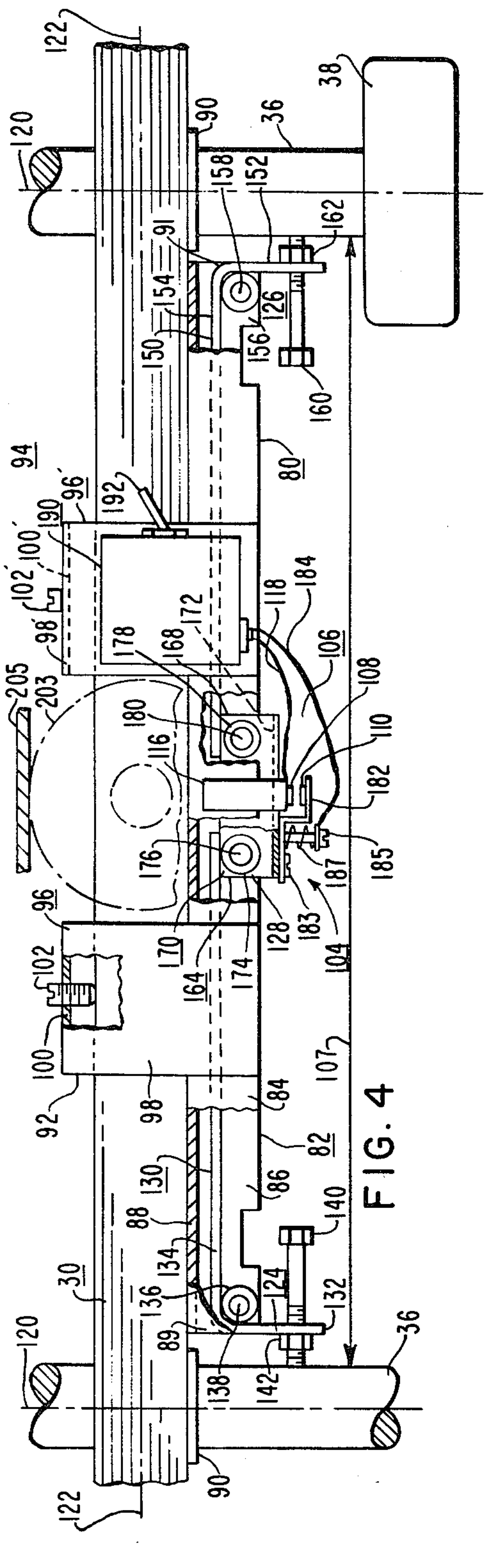
FIG. 4 is a plan view of the tool shown in FIG. 3.
Figure 3:
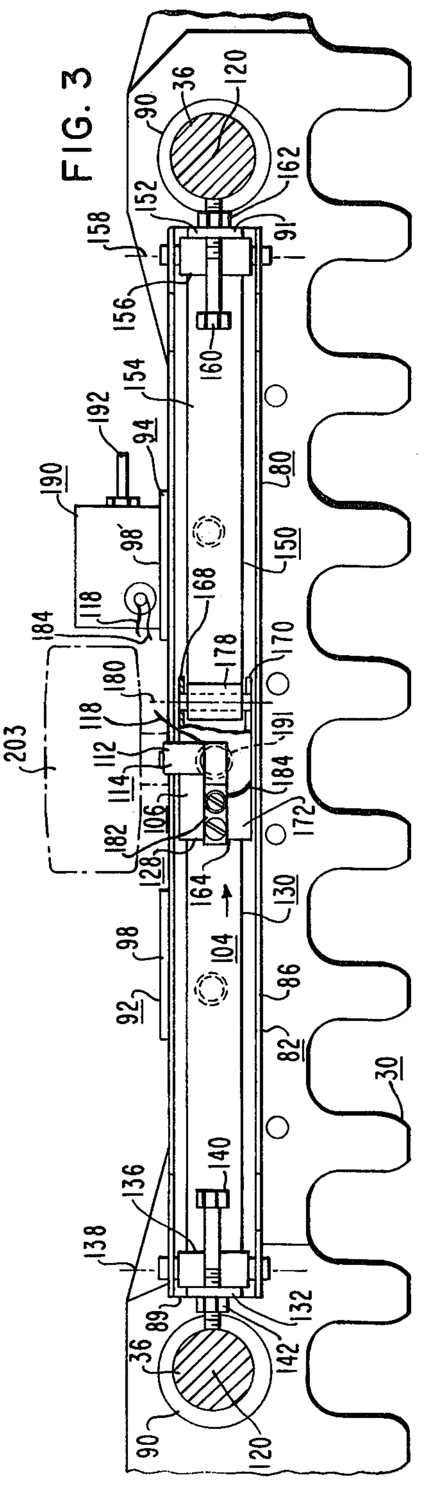
FIG. 3 is an elevational view of a new tool for indicating the direction of force at a predetermined step link location of an endless articulated belt shown in FIG. 1, while the escalator is operational.

The present invention relates to a new and improved apparatus or tool 80, shown in FIGS. 2, 3 and 4, for indicating the direction of force in escalator 11, while escalator 11 is in operation. The indication provided by tool 80 is used in a new and improved method for determining if the drive units of a plural drive escalator are properly spaced to provide the desired sharing of load. If they are not properly spaced, the method also determines the exact dimension by which each drive unit should be moved, and the direction of movement, to achieve the desired load sharing. The construction of tool 80 will first be described, and then the new and improved method which utilizes the tool 80 in a step thereof, will be described.

More specifically, FIG. 2 illustrates tool 80 mounted on a step link 30, on the vertical side of step link 30 which is adjacent to the guide wheels 38, since there is more clearance on this side of the step link than there is on the side adjacent to the steps 26. As will be hereinafter explained, the tool 80 is first installed on a step link on one of the closed loops 32 or 34, and then on the other, in order to detect and correct misalignment, as well as to detect and correct incorrect spacing of the drive units. FIG. 3 is an elevational view of the tool 80 shown in FIG. 2, and FIG. 4 is a plan view of tool 80. Tool 80 includes a first major portion in the form of a mounting or support member 82, which functions as a partial housing for the tool. Support member 82 is an elongated member having a substantially U-shaped cross-sectional configuration, turned 90° from the normal orientation of the letter U, including first and second leg portions 84 and 86, respectively, and a connecting back or bight portion 88. Member 82 has first and second ends 89 and 91, with the longitudinal length of support member 82 being selected to be slightly less than the dimension between the step link bearings 90 which mount the step axles 36 for rotation relative to the step links 30. This enables the back portion 88 to be placed firmly against a vertically extending side portion of a step link 30. The back portion 88 may have suitable openings formed therein to prevent interference with the rivets which connect the laminations of the step link together.

Support member 82 includes means for clamping, or otherwise fixing, the support member to a step link, such as first and second clamping arrangements 92 and 94, respectively. Each of the clamping arrangements, such as arrangement 92, for example, may include a substantially L-shaped right angle member 96 having first and second leg portions 98 and 100, respectively. Leg portion 100 may have a tapped opening therein for receiving a clamp screw 102. Leg portion 98 is welded, or otherwise suitably fixed, to the first leg portion 84 of support member 82, such that it extends outwardly from back portion 88. The back portion 88 of support member 82, and the second leg portion 100 of the clamping assembly 96, define a space for receiving the thickness dimension of a step link 30. Clamp screw 102 is advanced inwardly against a side of the step link 30, to firmly clamp the mounting member 82 to the step link. Clamping assembly 94 is similar to clamping assembly 92, and its elements are referenced with the same reference numerals as like elements of assembly 92, with the addition of a prime mark. The clamp screw 102' of clamping assembly 94 is advanced inwardly against the side of the step link, to complete the step of clamping tool 80 to the step link.

A second major portion of tool 80 includes means 104 which is pivotally related to support member 82. Means 104 is responsive to the dimension 106 between the step axles 36 which are located at the ends of the step link to which tool 80 is attached. The spacing or dimension between the step axles changes as the forces related or applied to step link 30 change direction, i.e., as the step link 30 changes from being in tension to being in compression, and it is thus a convenient indicator of force direction.

Means 104 is arranged to actuate suitable actuatable means, such as a set 106 of first and second electrical contacts 108 and 110, respectively, with one condition of the contact set, such as contact engagement, indicating a force direction which compresses step link 30, and with the other condition of the contact set, i.e., non-engagement, indicating non-compression, i.e., zero forces, or forces which tension the link 30. Other suitable actuatable means include proximity switches and optical links.

The first electrical contact 108 is a stationary contact insulatingly carried by the support member 82. For example, contact 108 may be mounted on a first leg 112 of a right angle mounting member 114, with its remaining or second leg 116 secured to the first leg portion 84 of the support member 82 via insulating washers and screws, such that contact 108 is electrically isolated from support member 82. An electrical lead 118 is electrically connected to contact 108.

The second electrical contact 110 is carried by means 104, as will be hereinafter described.

Means 104 is not only responsive to the dimension 106, and to changes in this dimension, but it also multiplies the changes such that the very small change in actual spacing between the step axles from tensioning to compressive forces is multiplied to a practical movement suitable for initially adjusting and operating the set 106 of contacts. For example, the total change in dimension 106 from tension to compression is only about 0.005 inch to 0.010 inch, due to normal bushing "play", when the endless belt 15 is new. If the contacts 108 and 110 had a gap of only 0.005 to 0.010 inch between their open and closed positions, they would be extremely difficult to properly adjust, and to prevent false or incidental closing due to vibration and normal operation of the escalator 11. Thus, means 104 is arranged to multiply the total dimensional change many times, such as about 8 times in the disclosed embodiment. Thus, a total dimensional change of 0.005 inch to 0.010 inch translates to a contact movement of 0.040 inch to 0.080 inch.

Means 104 is also arranged such that it is responsive only to an actual change in dimension 106, ignoring like movements of the step axles 36 due to changes in the alignment between the longitudinal axes 120 of the step axles 36, and the longitudinal axis 122 of the step link 30.

More specifically, means 104 is a pivotable assembly comprising first and second lever arrangements 124 and 126, certain ends of which are pivotally interrelated via a contact carrier assembly 128. Contact carrier assembly 128 carries the second or movable contact 110 of the contact set 106.

The first lever arrangement 124 includes a right angle member or lever 130 having first and second leg portions 132 and 134, respectively, with leg portion 134 being substantially longer than leg portion 132, such as about 6.5 inches versus 1.5 inches, in a preferred embodiment of the invention wherein the nominal dimension between the axes 120 of the step links is 16 inches. Lever 130 is pivotally fixed to support member 82 via a pivot pin 136. Pivot pin 136, for example, may be welded to lever 130 at the 90° junction of its leg portions 132 and 134, with the longitudinal ends of pivot pin 136 extending through aligned openings in leg portions 84 and 86 of the support member 82. The openings for receiving the pivot pin 136 are disposed near the longitudinal end 89 of the support member 82, and it is spaced away from back portion 88 of the support member, in order to enable lever 130 to pivot about a pivot axis 138 for a predetermined angular movement without interference between the outwardly extending end of leg portion 134 and the back portion 88 of support member 82.

A tapped opening is provided in leg portion 132 of lever 130, and a bolt 140 is threadably inserted therein such that the bolt head is within the 90° angle defined by leg portions 132 and 134 of lever 130. A nut 142 is threadably engaged with bolt, after the bolt 140 has been advanced to extend completely through the leg portion 132.

In like manner, the second lever arrangement 126 includes a lever 150 having first and second leg portions 152 and 154, respectively. Lever 150 is pivotally fixed to support member 82 via a pivot pin 156 having a pivot axis 158, which pin is fixed to lever 150 at the 90° junction of its leg portions 152 and 154. A tapped opening in leg portion 152 receives a bolt 160, and a nut 162 is threadably engaged with bolt 160.

The ends of leg portions 134 and 154 of levers 130 and 150, respectively, extend towards one another in aligned but spaced relation, and they are each pivotally fixed to contact carrier assembly 128. Contact carrier assembly 128 is supported by levers 130 and 150, and is free to move relative to the support member 82. Contact carrier assembly 128 includes a member 164 having a substantially U-shaped cross-sectional configuration, including first and second leg portions 168 and 170, respectively, and a connecting bight or back portion 172. Member 164 is dimensioned between the outer surfaces of its leg portions to fit within leg portions 84 and 86 of support member 82, without interference therewith.

The end of leg portion 134 of lever 130 is pivotally fixed to member 164 via a pivot pin 174 having a pivot axis 176. Pivot pin 174 is welded, or otherwise suitably fixed to lever 130, with the longitudinal ends of pivot pin 174 extending through aligned openings in leg portions 168 and 170, to secure it in pivotal relation to member 164.

In like manner, the end of leg portion 154 of lever 150 is pivotally fixed to memb r 164 via a pivot pin 178 having a pivot axis 180. The pivot axes 176 and 180 are disposed in spaced relation with one another near the extreme ends of leg portions 168 and 170.

Electrical contact 110 is mounted on one leg of a Z-shaped contact arm 182, and the other end is fixed to the back portion 172 of member 164 via a pair of screws 183 and 185. An electrical lead 184 is connected to contact 110, such as to one of the screws. In order to provide a resilient bias on contact 110 as it engages contact 108, a spiral spring 187 may be disposed about screw 185, with screw 183 being located at the extreme end of the contact arm 182, and with screw 185 being disposed through an intermediate portion of the contact arm. This enables arm 182 to bend outwardly during engagement, with spring 187 providing an inward bias on the contact 110.

Biasing means, such as a spiral compression spring 191, is disposed between the back portion 98 of support member 82, and the back portion 172 of member 164, to bias the assembly 104 and electrical contact 110 outwardly, away from back portion 88. Spring 191 ensures instant and sensitive response of carrier assembly 128 to a change in axle spacing 106, by removing all backlash or free play in pivots 138, 158, 176 and 180.

Audible and/or visual indicating means 190 is provided, to indicate when contacts 108 and 110 are engaged. As shown schematically in FIG. 8, indicating means 190 may include a switch 192, a battery 194, and a lamp 196, all serially connected between contacts 108 and 110 via the electrical leads 118 and 184. The lamp 196 may be replaced with a buzzer or bell 198, or, as indicated, the lamp 196 and buzzer 198 may be connected in parallel between contacts 108 and 110 to provide both an audible and a visual indication of contact engagement.

Figure 5:
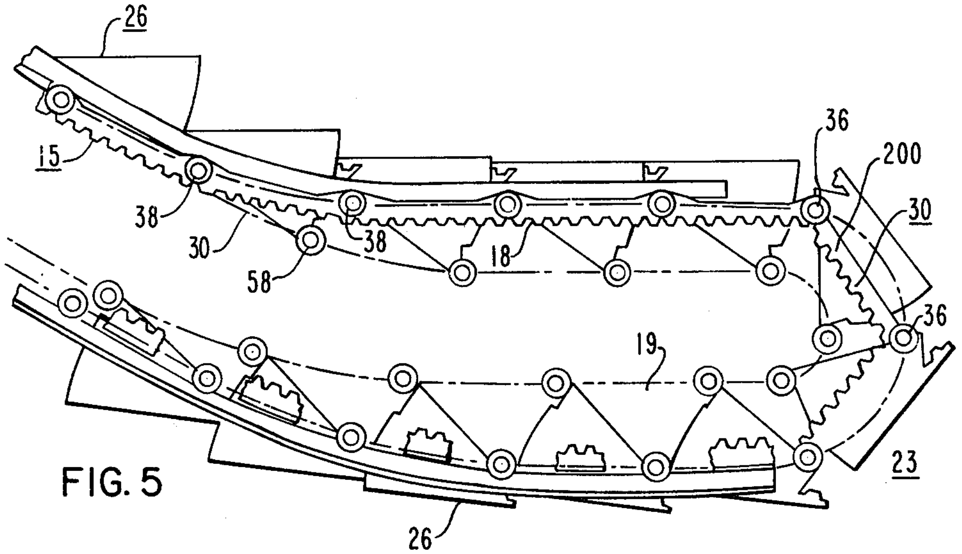
FIG. 5 is an enlarged view of the lower turnaround of the escalator shown in FIG. 1, illustrating where the step link should be positioned when the tool shown in FIGS. 2 and 3 is attached thereto and adjusted.

Tool 80 may be attached to a step link 30 at any convenient location, but the initial adjustment of tool 80 must be performed while the associated step link is in tension, i.e., when the spacing 106 between the associated step axles 36 at the ends of the step axle in question is a maximum. A convenient location for both the attachment and adjustment of tool 80 is at the lower turn-around 23. The floor plate at the lower turn-around 23 may be removed in order to gain access to the step links. FIG. 5 is a fragmentary, elevational view of belt 15 as it changes between the load bearing run 18 and the return run 19 via the lower turn-around 23. A step link 30 in the position of link 200, between the substantially horizontal portion of the load bearing run 18 and the curved portion of the turn-around 23, naturally puts the step link in this position in tension, and the spacing between the step axles at the ends of this link is a maximum. This link will have a nominal inclination from the horizontal of about 45° at this particular location, but any angle from about 30° to 60° is suitable, as the link within this angular range will be in tension.

Figure 6:
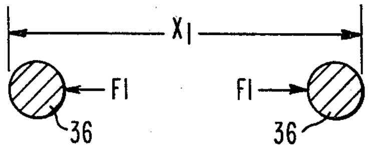
FIG. 6 indicates a first step in a method of determining the maximum change in the spacing between two adjacent step axles, as a step link changes from being in tension to being in compression.
Figure 7:
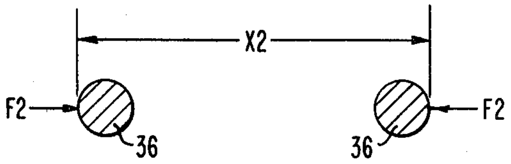
FIG. 7 indicates a second step in making the determination of the maximum change in spacing, as set forth relative to FIG. 6.

For proper initial adjustment of contact clearance, as well as for practicing the new and improved method of determining the correct positioning of the drive units, it is important to know the total change in the dimension 106 between adjacent step axles 36, as the step link changes from being in tension to being in compression. As shown diagrammatically in FIG. 6, when a link is in tension, its associated step axles are subjected to forces F1 which tend to increase the dimension 106 between the step axles. A convenient arrangement for measuring the change in the spacing dimension is to use a dial gauge actuated by contact arms disposed on the outside of the step axles 36, to measure the dimension X1 shown in FIG. 6. Dimension X1 is measured while the step axles are subjected to the separating forces F1. The dimension between the outsides of the step axles is measured again while the same two step axles 36 are subjected to forces F2 which place link 30 in compression, and tend to reduce the dimension 106 shown in FIG. 4. This measurement is referred to as measurement X2 in FIG. 7. The difference between measurements X1 and X2 is equal to the total dimensional change C from tension to compression, i.e., $X1-X2=C$. Dimension C is used initially to adjust the spacing between contacts 108 and 110 while the step link 30 to which tool 80 is attached is in tension, e.g., while this step link is in location 200 shown in FIG. 5. If dimension C is 0.005 inch, for example, and the multiplication provided by the lever arrangement multiplies the change in axle spacing by a factor of 8, the total movement of contact 110 will be 0.040 inch. Thus, the initial spacing between contacts 108 and 110 should be set slightly less than the total movement, such as a spacing of about 0.030 inch, to assure good contact pressure when the link forces change from tensioning to compressive forces.

The tool 80 is first clamped to a step link 30 on one side of the endless belt 15, such as to the side defined by loop 32, as shown in FIG. 2, while the associated link is in tension, such as on a link in the location 200 shown in FIG. 5. If the guide arrangement for belt 18 includes a guide roller 203 on each link, shown in phantom in FIGS. 3 and 4, which roller co-acts with a guide angle 205, the guide roller 203 may be temporarily removed to facilitate the attachment of tool 80. The contact spacing adjustment is then made by adjusting bolts 140 and 160 inwardly, or outwardly, as required, such that the spacing between contacts 108 and 110 is the desired spacing, such as the 0.030 inch spacing of the previous example. This spacing should be achieved while an imaginary line drawn through the pivot axes 176 and 180 is parallel with the back portion 88 of support member 82. Once these pivot axes are properly positioned, and the contact spacing achieved, nuts 142 and 152 are tightened against leg portions 132 and 152, respectively, to maintain the selected adjustment.

Figure 8:
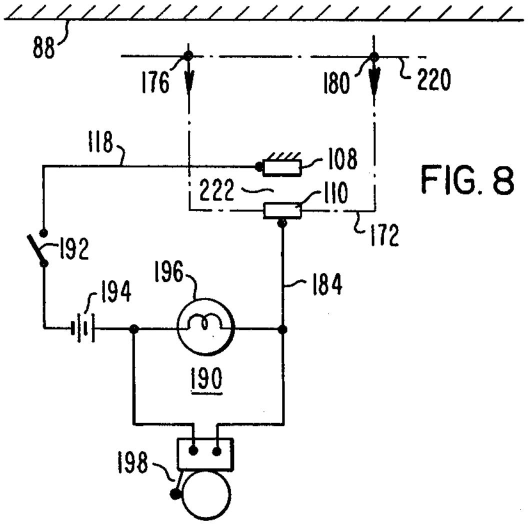
FIG. 8 is a partially diagrammatic and partially schematic representation of the tool shown in FIGS. 3 and 4, with the associated step link in tension.

FIG. 8 diagrammatically and schematically illustrates the pivot axes 176 and 180 of the contact carrier assembly 104, the electrical contacts 108 and 110, and the indicating means 190. FIG. 8 sets forth the initial adjustment achieved with the associated step link in tension, wherein an imaginary line 220 through the pivot axes 176 and 180 is parallel with back portion 88, while achieving the desired spacing 222 between the electrical contacts.

Figure 9:
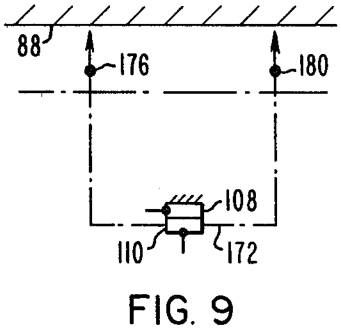
FIG. 9 is a diagram similar to that of FIG. 8, except with the associated step link in compression.

FIG. 9 illustrates how the pivot axes 176 and 180 uniformly move towards back portion 88 when the spacing between step axles is reduced, i.e., lever 130 rotates CCW about its pivot axis 138 while lever 150 rotates CW about its pivot axis 158. This like movement of pivot axes 176 and 180 towards back portion 188 causes contact 110 to engage contact 108 and signal the change in force direction.

Figure 10:
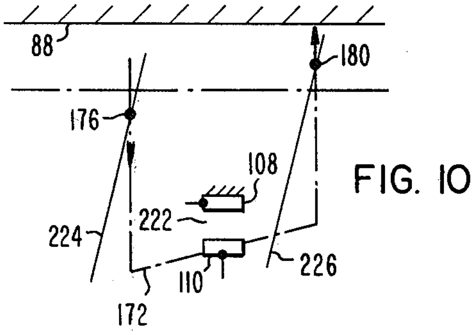
FIG. 10 is a diagram similar to that of FIG. 8, with the associated step link in tension, with a slight misalignment between the step axles and the associated step link.

FIG. 10 illustrates how tool 80 ignores step axle movement due to a change in the alignment between the step axles at the ends of a step link, with the actual spacing 106 remaining constant. If the step axles 36 at the left and right-hand sides of the step link 30, as viewed in FIG. 4, should change alignment in a direction such as indicated by lines 224 and 226, lever 130 will rotate CW causing pivot axis 176 to move away from back portion 88, and lever 150 will also rotate CW by a like angular movement, skewing back portion 172 of member 164, but the position of contact 110 remains substantially unaffected, maintaining the gap 222 as long as the belt 15 at the location of tool 80 stays in tension.

After tool 80 is attached to a step link and adjusted, the new dynamic method of determining proper drive unit positioning is continued by operating the escalator 11 in the up travel direction, wherein the steps 26 are transported up the incline on the load bearing run 18. An installation or maintenance person rides on the step located immediately above the step link to which the tool 80 is attached. The rider has a suitable marking implement, such as a piece of chalk. The belt 15 should normally be in tension, with the forces desirably changing to compression only as the belt 15 is engaged by the drive sprocket of the drive unit. The compressive forces should then exist for only one or two step links, i.e., for 16 to 32 inches, up the incline from the drive sprocket. Thus, as the toothed step link to which tool 80 is attached is engaged by the lowest drive unit on the incline, such as drive unit 48 shown in FIG. 1, the buzzer 198 will sound and/or the lamp 196 will light. There is sufficient clearance between the step and the skirt to see the light from the lamp, if a lamp is used. The rider immediately marks a stationary portion of the escalator 11 when the buzzer is heard, or the light observed, such as by marking the skirt portion adjacent to the step 26. As shown in FIG. 1, this first mark will be made at a location 210. When the link forces change from compression to tension forces, the buzzer sound and/or light will cease, and the rider again marks the skirt at a location 212. Since the rider's reaction time in placing marks 210 and 212 will be same, the distance B between the marks is a highly accurate representation of the distance above drive unit 48 in which compressive forces exist in belt 15.

When the belt 15 is engaged by the next higher drive unit 46, the rider again places a mark 214 on the skirt when the buzzer or light is actuated, and a mark 216 when the sound or light ceases, to provide a dimension A above drive unit 46 during which compressive forces exist in the belt 15. This procedure may be repeated several times and the results averaged to provide a very high degree of accuracy.

The escalator 11 is then stopped with the tool 80 at the approximate location 200 shown in FIG. 5. The tool 80 is removed and placed on a step link 30 which is at location 200 on the other side of the belt 15, such as the side defined by loop 34, if the side defined by loop 32 was initially selected. The escalator 11 is again started in the up travel direction, and the same procedure is followed, marking the skirt on the other side of the escalator as the sound or light is observed. The reason for checking both sides is to determine if each drive unit is properly aligned. Different B dimensions and /or different A dimensions, will indicate misalignment of the associated drive unit. Thus, in addition to achieving the desired drive unit spacing, the new method also enables correct drive unit alignment to be detected and corrected.

If the buzzer or light is not actuated as tool 80 passes over a drive unit, the drive unit is too far down the incline and it should be moved up the incline and the test repeated until the tool indicates link compression as the belt 15 leaves a drive unit.

After the A and B measurements are taken, they are then used to determine if the drive units are correctly aligned and spaced, by using the following equations:

$$a=C(A/L-X) \quad (1)$$

$$b=a+C(B/L-X) \quad (2)$$

The letter "a" in the equations is the distance in inches that the first drive which is located below the uppermost drive, i.e., drive unit 46, should be moved down the incline. The letter "b" is the distance in inches that the next lower drive unit, i.e., drive unit 48, should be moved down the incline. The letter C is the clearance value determined from the X1−X2 measurements which were hereinbefore described relative to FIGS. 6 and 7. The letter "A" is the measurement in inches shown in FIG. 1 between the marks 214 and 216, and the letter "B" is the measurement in inches shown in FIG. 1 between the marks 210 and 212 associated with drive unit 48. If more than three drive units are used, the distance that each additional drive should be moved would be determined in the same manner. The letter "L" in equations (1) and (2) is the distance between the centerlines 120 of the step axles 36, and the letter "X" is the desired number of step links which should be in compression at each drive unit. These values, by way of example, may be 16 and 2, respectively, and would be determined by the specific escalator whose drive units are to be checked for position and alignment.

For purposes of example, assume that the dimension A, on both sides of the escalator, is 64 inches, and that the clearance C is 0.010 inch. Using equation (1) gives:

$$a=0.010(64/16-2)=0.020 \text{ inch}$$

Thus, drive unit 46 should be moved down the incline by 0.020 inch.

If dimension B is 72 inches on one side and 80 inches on the other, for example, indicating a slight misalignment of drive unit 48, using equation (2) for the one side gives:

$$b_1=0.020+0.010(72/16-2)=0.045 \text{ inch}$$

Using equation (2) for the other side gives:

$$b_2=0.020+0.010(80/16-2)=0.050 \text{ inch}$$

Thus, the one side should be moved down the incline by a dimension of 0.045 inch, and the other side by a dimension of 0.050 inch.

We claim as our invention:

1. A tool for optimally adjusting the locations of the drive units of a plural drive escalator, which drive units drive an endless, articulated belt constructed of rigid, toothed step links, pivotally interconnected via step axles, comprising:

a support member, said support member including means for attaching said support member to a step link, with the ends of the step link being associated with first and second step axles, a first electrical contact carried by said support member, a second electrical contact, means pivotally related to said support member and responsive to the dimension between the first and second step axles for moving said second electrical contact towards engagement with said first electrical contact when said step link is placed in compression by a drive unit and said dimension is reduced, and indicating means for indicating when said first and second electrical contacts are engaged.

2. The tool of claim 1 wherein the means responsive to the dimension between two adjacent step axles includes means for multiplying a change in the dimension by a predetermined factor, such that for each unit of dimensional change between the adjacent step axles the second electrical contact is caused to move by an amount equal to the unit multiplied by the predetermined factor.

3. The tool of claim 1 wherein the means responsive to the dimension between two adjacent step axles includes means for cancelling the effect of alignment changes between the step axles and step links.

4. The tool of claim 1 wherein the means responsive to the dimension between two adjacent step axles includes means for multiplying a change in the dimension by a predetermined factor, while ignoring like movements of adjacent step axles due to changes in the alignment between the step axles and step links.

5. The tool of claim 1 wherein the means responsive to the dimension between adjacent step axles includes first and second levers each having first and second leg portions, means pivotally mounting said first and second levers to the support member such that their first leg portions are in substantially parallel, spaced relation with the first and second step axles, respectively, and their second leg portions extend towards one another such that their ends are in spaced alignment, a contact carrier on which the second electrical contact is mounted, means pivotally interconnecting the ends of the second leg portions of the first and second levers via said contact carrier, means for biasing the contact carrier away from the support member, and means adjustably attached to the first leg portions of the first and second levers which contact the first and second step axles, respectively, to translate a change in the dimension between the first and second step axles into a greater movement of the contact carrier and of the second electrical contact, with the means attached to the first leg portions being adjusted such that the first and second electrical contacts are spaced apart when the associated step link is in tension, and engaged when it is in compression.

6. A tool for optimally adjusting the locations of the drive units of a plural drive escalator, which drive units drive an endless, articulated belt constructed of rigid, toothed step links, pivotally interconnected via step axles, comprising:

a support member, said support member including means for attaching said support member to a step link, with the ends of the step link being associated with first and second step axles, pivot means pivotally related to said support member and responsive to the dimension between the first and second step axles, actuatable means arranged for actuation by said pivot means when said step link is placed in compression by a drive unit and the dimension between the first and second step axles is reduced, and indicating means for indicating when said actuatable means has been actuated by said pivot means, and second electrical contacts are engaged.

7. The tool of claim 6 wherein the pivot means includes means for cancelling the effect of alignment changes between the step axles and step links.

8. The tool of claim 5 wherein the pivot means includes means for multiplying a change in the dimension between the first and second step axles by a predetermined factor, while ignoring like movements of the step axles due to changes in the alignment between the step axles and step links.

9. The tool of claim 5 wherein the means responsive to the dimension between adjacent step axles includes first and second levers each having first and second leg portions, means pivotally mounting said first and second levers to the support members such that their first leg portions are in substantially parallel, spaced relation with the first and second step axles, respectively, and their second leg portions extend towards one another such that their ends are in spaced alignment, carrier means, means pivotally interconnecting the ends of the second leg portions of the first and second levers via said carrier means, means for biasing said carrier means away from the support member, and means adjustably attached to the first leg portions of the first and second levers which contact the first and second step axles, respectively, to translate a change in the dimension between the first and second step axles into a greater movement of said carrier means, said carrier means being arranged to operate the actuatable means, with the means attached to the first leg portions being adjusted such that the actuatable means is unactuated when the associated step link is in tension, and actuated when it is in compression.

10. A method of determining the optimal positions of a plurality of drive units of a plural drive escalator, which drive units drive an endless, articulated belt constructed of rigid, toothed step links, pivotally interconnected via step axles to which the escalator steps are attached, comprising the steps of: attaching indicating means to a step link, on one side of the articulated belt, with said indicating means being in a first condition when a step link is in compression, and in a second condition when it is not, operating the escalator in the up travel direction, riding the moving escalator adjacent to the indicating means, placing a first mark on a stationary portion of the escalator at each drive location below the uppermost drive unit, when the indicating means changes from the second condition to the first condition to indicate that the step link has been engaged by a drive unit and the step link has been placed in compression, placing a second mark on a stationary portion of the escalator when the indicating means changes back to the first condition, measuring the distance between the first and second marks at each drive unit, and using the measured distances to determine the optimal spacing of the drive units.

11. The method of claim 10 including the step of attaching the indicating means to a step link on the other side of the articulated belt, after the measuring step on the first side, and repeating the operating, riding, placing and measuring steps, with the using step determining the optimal position of each drive unit relative to each side of the endless belt, to align each drive unit as well as to optimally space the drive units.

12. The method of claim 10 wherein the indicating means indicates when a step link is in compression by being responsive to the spacing between the step axles at the ends of the associated step link, and including the step of measuring the change C in this spacing between tension and compression of a step link, and wherein the distance between the first and second marks associated with the first drive unit below the uppermost drive unit is dimension A, and wherein the using step determines the distance that the first drive unit below the uppermost drive should be moved according to the relationship:

$$a = C(A/L - X)$$

wherein L is the nominal distance between the centerlines of adjacent step axles, and X is the optimum number of step links which should be placed in compression at each drive unit.

13. The method of claim 12 wherein the distance between the first and second marks associated with the second drive unit below the uppermost drive unit is dimension B, and wherein the using step determines the distance b that this drive unit should be moved, according to the relationship:

$$b = a + C(B/L - X).$$

14. A method of indicating the direction of force in a moving escalator having a plurality of drive units coupled to an endless, articulated belt constructed of rigid, toothed step links pivotally interconnected via a plurality of step axles to which the escalator steps are attached, comprising the steps of:

attaching indicating means to a step link of the endless belt which indicates when the step link is in compression, riding the escalator adjacent to the indicating means, and noting the operation of the indicating means.

* * * * *